(12) United States Patent
Salem et al.

(10) Patent No.: US 11,021,596 B2
(45) Date of Patent: Jun. 1, 2021

(54) HYDROGENATED NITRILE-DIENE-CARBOXYLIC ESTER COPOLYMERS

(71) Applicant: ARLANXEO DEUTSCHLAND GMBH, Dormagen (DE)

(72) Inventors: Hiyam Salem, Cologne (DE); Karola Schneiders, Bergisch Gladbach (DE); Susanna Lieber, Kaiserslautern (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 16/349,143

(22) PCT Filed: Nov. 9, 2017

(86) PCT No.: PCT/EP2017/078698
§ 371 (c)(1),
(2) Date: May 10, 2019

(87) PCT Pub. No.: WO2018/103989
PCT Pub. Date: Jun. 14, 2018

(65) Prior Publication Data
US 2019/0284374 A1 Sep. 19, 2019

(30) Foreign Application Priority Data
Dec. 9, 2016 (EP) ..................................... 16203271

(51) Int. Cl.
| | | |
|---|---|---|
| *C08L 15/00* | (2006.01) | |
| *C08F 236/12* | (2006.01) | |
| *C08F 220/26* | (2006.01) | |
| *C08K 5/14* | (2006.01) | |
| *C08L 9/02* | (2006.01) | |
| *C08C 19/02* | (2006.01) | |
| *C08F 8/04* | (2006.01) | |
| *C08F 220/28* | (2006.01) | |

(52) U.S. Cl.
CPC ............ *C08L 15/005* (2013.01); *C08C 19/02* (2013.01); *C08F 220/26* (2013.01); *C08F 236/12* (2013.01); *C08K 5/14* (2013.01); *C08L 9/02* (2013.01); *C08F 8/04* (2013.01); *C08F 220/285* (2020.02); *C08F 2800/20* (2013.01)

(58) Field of Classification Search
CPC .......................... C08L 15/005; C08F 236/12; C08F 2220/285; C08F 220/26; C98K 5/14; C08K 5/14
See application file for complete search history.

(56) References Cited

U.S. PATENT DOCUMENTS

| 10,494,467 B2 * | 12/2019 | Obrecht ................. C08F 236/12 |
| 2008/0293868 A1 * | 11/2008 | Obrecht ................. C08F 236/12 524/439 |
| 2016/0257773 A1 | 9/2016 | Obrecht et al. |

FOREIGN PATENT DOCUMENTS

| CN | 105705539 A | 6/2016 |
| EP | 0795580 A1 | 9/1997 |
| EP | 2857447 A1 | 4/2015 |
| EP | 2857448 A1 | 4/2015 |
| WO | 0202657 A2 | 1/2002 |
| WO | 2016174203 A1 | 11/2016 |

OTHER PUBLICATIONS

Translation of the International Search Report for corresponding application PCT/EP2017/078698 dated Mar. 20, 2018.
Written Opinion of the International Searching Authority for corresponding application PCT/EP2017/078698 dated Mar. 20, 2018.
European Search Report for corresponding application EP 16203271.8 dated Apr. 7, 2017.

* cited by examiner

*Primary Examiner* — Robert D Harlan
(74) *Attorney, Agent, or Firm* — Norris McLaughlin PA

(57) ABSTRACT

The present invention relates to hydrogenated nitrile-diene-carboxylic ester copolymers, to the production thereof, to vulcanizable mixtures containing hydrogenated nitrile-diene-carboxylic ester copolymers and the production thereof, and also to vulcanizates based on hydrogenated nitrile-diene-carboxylic ester copolymers and to the use thereof in belts.

21 Claims, No Drawings

HYDROGENATED NITRILE-DIENE-CARBOXYLIC ESTER COPOLYMERS

This is an application filed under 35 USC 371 based on PCT/EP2017/078698, filed 09.Nov.2017, which in turn is based on EP 16203271.8 filed 09.Dec.2016. The present application claims the full priority benefit of these prior applications and herein incorporates by reference the full disclosures of these prior applications.

The present invention relates to hydrogenated nitrile-diene-carboxylic ester copolymers, to the production thereof, to vulcanizable mixtures containing hydrogenated nitrile-diene-carboxylic ester copolymers and the production thereof, and also to vulcanizates based on hydrogenated nitrile-diene-carboxylic ester copolymers and to the use thereof in belts.

The term nitrile-butadiene copolymer (nitrile rubber, also abbreviated to "NBR") in the context of the present application is to be understood as meaning rubbers which are co-, ter- or quaterpolymers of at least one α,β-ethylenically unsaturated nitrile, at least one conjugated diene and optionally one or more additional copolymerizable monomers.

The term hydrogenated nitrile-butadiene copolymer ("HNBR") is to be understood as meaning corresponding co-, ter- or quaterpolymers in which the sum of the C=C double bonds in the copolymerized diene units has been completely or partially hydrogenated.

For many years, both NBR and HNBR have occupied an established position in the specialty elastomers sector. They have an excellent profile of properties, in the form of excellent oil resistance, good heat stability and excellent resistance to ozone and chemicals, the latter being even more pronounced in the case of HNBR than in the case of NBR. NBR and HNBR also have very good mechanical and performance characteristics. As a consequence they are widely used in a very broad range of applications and are employed for example for producing belts, seals, hoses and clamping elements in the automotive sector, also for stators, well seals and valve seals in oil production, and also for numerous parts in the electrical industry, mechanical engineering and shipbuilding. For many applications it is crucial that the vulcanizate based on HNBR has a low glass transition temperature (Tg) so that the functionality of the vulcanizate is ensured even at low temperatures. In addition, it is also necessary for the vulcanizate to exhibit the smallest possible swelling in contact with for example oil or fuels since otherwise the vulcanizate increases in volume and is no longer fit for use.

A multitude of different HNBR types are commercially available which, depending on the field of application, feature different monomers, molecular weights and polydispersities and consequently feature different mechanical and physical properties. In addition to the standard types, particularly specialty types featuring contents of special termonomers or particular functionalizations are becoming increasingly sought after.

Known special termonomers include for example α,β-ethylenically unsaturated carboxylic acids (inter alia acrylic acid and methacrylic acid). Terpolymers comprising these termonomers are referred to collectively as HXNBR, wherein the "X" represents the acid group. These include for example monocarboxylic acids, dicarboxylic acids and dicarboxylic monoesters (inter alia monomethyl maleate or monobutyl maleate).

Likewise known are terpolymers comprising α,β-ethylenically unsaturated carboxylic ester units (inter alia monocarboxylic esters such as methyl acrylate and butyl acrylate or dicarboxylic monoesters such as monobutyl maleate).

EP-A-1852447 discloses a highly saturated nitrile-containing terpolymer rubber comprising 10% to 40% by weight of α,β-ethylenically unsaturated nitrile units, 10% to 60% by weight of α,β-ethylenically unsaturated carboxylic ester units, for example butyl acrylate, and 20% to 70% by weight of a conjugated diene unit, which has a vulcanizate having balanced properties. The explicitly disclosed examples comprise HNBR terpolymer comprising acrylonitrile units in the range from 5% to 45% by weight (6 to 50 mol %) of acrylonitrile units, 40% to 75% by weight (43 to 77 mol %) of butadiene units and 5% to 38% by weight (2 to 20 mol %) of butyl acrylate units having a TR 10 down to −41° C. Nothing is disclosed about the swelling behaviour of the terpolymers in IRM 903. Polyethylene glycol acrylates (PEG acrylates) are not explicitly disclosed as α,β-ethylenically unsaturated carboxylic ester units.

EP-A-1247835 discloses a nitrile-containing highly saturated copolymer containing (a) 10% to 40% by weight of α,β-ethylenically unsaturated nitrile units, (b) 10% to 60% by weight of α,β-ethylenically unsaturated carboxylic ester units, (c) 0.01% to 21% by weight of conjugated diene units and 14% to 69.99% by weight of saturated conjugated diene units, wherein the sum of the monomer units (c) and (d) is 20% to 70% by weight and the ratio of the monomer units (d)/[(c)+(d)] is at least 70% by weight and the difference between the extrapolated starting temperature of the glass transition (Tig) and the extrapolated end temperature of the glass transition (Teg) is not greater than 10° C. The explicitly disclosed examples comprise HNBR terpolymers comprising 20% by weight (23 to 29 mol %) of acrylonitrile, 30% to 60% by weight (42 to 68 mol %) of butadiene and 20% to 50% by weight (10 to 30 mol %) of butyl acrylate. The vulcanized products of the copolymer rubbers exhibit good low-temperature resistance, oil resistance and good dynamic properties. Explicit working examples of HNBR terpolymers comprising 15% to 49.9% by weight of PEG acrylate units are not disclosed.

Moreover, EP-A-1243602 discloses a terpolymer containing (a) 0% to 20% by weight of 1,3-butadiene units, (b) 0% to 50% by weight of saturated 1,3-butadiene units, (c) 40% to 50% by weight of α,β-ethylenically unsaturated nitrile units, and (d) 10% to 35% by weight and at least 8 mol % of other monomer units, wherein the sum of the 1,3-butadiene units (a) and of the saturated 1,3-butadiene units (b) is in the range from 30% to 50% by weight. The other monomer unit may be inter alia unsaturated carboxylic esters. This nitrile-containing highly saturated copolymer rubber exhibits good oil resistance in the vulcanized product. Explicit HNBR terpolymers comprising hydrogenated PEG acrylate units are not disclosed. Only explicit examples with butyl acrylate are included.

Also known are nitrile-diene copolymers comprising PEG acrylate units.

EP-A-2868677 discloses a nitrile-containing copolymer comprising 1% to 9% by weight of monocarboxylic monoester units having a glass transition temperature of less than −20° C. and an oil swelling of less than 20%. Explicitly disclosed therein are terpolymers comprising 4.8% by weight and 7.7% by weight of methoxyethyl acrylate, i.e. PEG-1 acrylate, or comprising 4.1% by weight of PEG-5 methacrylate. EP-A-2868677 does not disclose any copolymers comprising at least 15% by weight of PEG acrylate units comprising two or more ethylene glycol repeating units.

EP-A-2868676 discloses a nitrile-containing copolymer comprising 1% to 9% by weight of α,β-ethylenically unsaturated carbonyl-containing monomer units. Explicit examples disclosed include hydrogenated terpolymers having PEG-11 monomers. However, EP-A-2868276 does not disclose any copolymers comprising at least 15% by weight of PEG acrylate comprising 2 to 12 ethylene glycol repeating units.

Terpolymers are often insufficient for more exact adjustment of the desired polymer properties. Quaterpolymers, i.e. polymers composed of four monomer units, are increasingly being used. Quaterpolymers comprising α,β-ethylenically unsaturated carboxylic acids and α,β-ethylenically unsaturated carboxylic esters are known.

EP-A-2392599 discloses an at least partially hydrogenated nitrile-butadiene copolymer containing 5% to 60% by weight of α,β-ethylenically unsaturated nitrile units, 20% to 83.9% by weight of conjugated diene units, 0.1% to 20% by weight of dicarboxylic monoester units, 11% to 50% by weight of alkoxyalkyl (meth)acrylate units having 2 to 8 carbon atoms. Table 2 describes, inter alia, quaterpolymers having a content of 21.3% or 24.8% by weight (27 to 30 mol %) of acrylonitrile, 46.6% or 47.3% by weight (57 mol %) of butadiene, 4.5% to 5% by weight (2 mol %) of mono-n-butyl maleate and 23.0% or 27.1% by weight (11 to 14 mol %) of methoxyethyl acrylate. The vulcanizates produced from these hydrogenated nitrile-butadiene copolymers exhibit good TR10 values. No indication of the swelling behaviour in IRM 903 or the glass transition temperature Tg is given. HNBR terpolymers having polyethylene glycol acrylate units are not explicitly disclosed. Likewise no terpolymers or quaterpolymers comprising less than 20% by weight of nitrile units are disclosed.

JP-A-2012-031311 describes a nitrile-containing, highly saturated copolymer rubber containing (a) 10.0% to 40.0% by weight of α,β-ethylenically unsaturated nitrile units, (b) 5.5% to 10.0% by weight of a, 3-ethylenically unsaturated dicarboxylic monoester units, (c) 11.0% to 30.0% by weight of alkoxyalkyl (meth)acrylate units comprising alkoxyalkyl groups having 2 to 8 carbon atoms and (d) 20.0% to 73.5% by weight of conjugated diene units, wherein at least a portion of the conjugated diene units is hydrogenated. HNBR terpolymers having polyethylene glycol acrylate units are not explicitly disclosed.

WO-A-2015/146650 discloses nitrile-containing, highly saturated copolymers containing less than 30 wt % of nitrile units, (b) conjugated diene units, (c) α,β-ethylenically unsaturated dicarboxylic monoester units and (d) methoxyethyl acrylate. The examples explicitly disclose a quaterpolymer containing 24% by weight of acrylonitrile units, 46% by weight of butadiene units, 23% by weight of methoxyethyl acrylate and 7% by weight of mono-n-butyl maleate. HNBR quaterpolymers comprising polyethylene glycol acrylate units are not explicitly disclosed.

WO-A-2016/059855 discloses copolymers containing (a) 0.1% to 15% by weight of α,β-ethylenically unsaturated nitrile units, (b) 1% to 10% by weight of α,β-ethylenically unsaturated dicarboxylic monoester units, (c) 40% to 75% by weight of α,β-ethylenically unsaturated monocarboxylic ester units and (d) 20% to 58.9% by weight of diene units. HNBR terpolymers having polyethylene glycol acrylate units are not explicitly disclosed.

The choice of monomer or of monomers and the amount of the employed monomers has a decisive influence on the polymer properties and is thus not readily predictable.

The previously disclosed hydrogenated nitrile-butadiene-carboxylic ester copolymers which in addition to nitrile units and diene units contain as termonomer units exclusively monocarboxylic acids, carboxylic esters such as butyl acrylate or monobutyl maleate, PEG-1 acrylate or small amounts of PEG acrylate, do not adequately fulfil the requirement of a low glass transition temperature of less than −40° C. and a swelling of 51% or less in the vulcanizate.

A problem addressed by the present invention was accordingly that of providing a hydrogenated nitrile-diene copolymer which in a vulcanizate results in an improved glass transition temperature of less than −40° C., preferably of −44° C. or less, and simultaneously exhibits adequate swelling properties of 51% or less. A further problem addressed was that of providing HNBR copolymers having a very particularly low gel content. In addition a further problem addressed was that of ensuring that the dynamic and mechanical properties of the provided HNBR copolymer are similarly balanced as in previously disclosed HNBR polymers. In addition a problem addressed was that of providing an HNBR copolymer, the production of which employs a small amount of environment- and health-endangering substances.

The solution to the problem provided by the present invention is a hydrogenated nitrile-diene-carboxylic ester copolymer containing (a) 0.1% to 20% by weight, preferably 1% to 19% by weight and particularly preferably 8% to 18% by weight of at least one α,β-ethylenically unsaturated nitrile unit, (b) 15% to 74.9% by weight, preferably 21% to 73% by weight and particularly preferably 27% to 65% by weight of at least one conjugated diene unit and (c) 25% to 65% by weight, preferably 26% to 60% by weight and particularly preferably 27% to 55% by weight of at least one α,β-ethylenically unsaturated carboxylic ester unit, wherein at least 15% by weight, preferably at least 20% by weight, of the α,β-ethylenically unsaturated carboxylic ester units (c) based on the total amount of all monomer units of 100% by weight are derived from a PEG acrylate (d) of general formula (I)

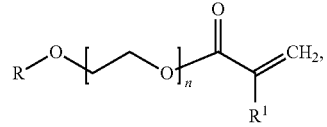

formula (I)

wherein

R is branched or unbranched $C_1$-$C_{20}$-alkyl, preferably $C_2$-$C_{20}$-alkyl, particularly preferably ethyl, butyl or ethylhexyl, n is 2 to 12, preferably 2 to 8, particularly preferably 2 to 5 and very particularly preferably 2 or 3 and $R^1$ is hydrogen or $CH_3$—.

It is noted at this point that the scope of the invention encompasses any and all possible combinations of the components, ranges of values, radical definitions and/or process parameters recited hereinabove and intimated hereinbelow which are general or recited in ranges of preference.

The term "copolymer" encompasses polymers having more than one monomer unit.

In one embodiment of the invention the copolymer is derived for example exclusively from the three monomer types (a), (b) and (d) and is therefore a terpolymer. Accordingly, all α,β-ethylenically unsaturated carboxylic ester units (c) of the hydrogenated nitrile-diene-carboxylic ester copolymer are PEG acrylate units (d) of general formula (I).

Likewise also encompassed by the term copolymer are for example quaterpolymers, derived from the three monomer types (a), (b) and (d) and a further α,β-ethylenically unsaturated carboxylic ester unit (c) distinct from the PEG acrylate unit (d).

The term "nitrile-diene-carboxylic ester copolymer" refers in the context of the present invention to a copolymer containing at least one α,β-ethylenically unsaturated nitrile unit, at least one conjugated diene unit and at least one α,β-ethylenically unsaturated carboxylic ester unit. The term accordingly also encompasses copolymers having two or more α,β-ethylenically unsaturated nitrile monomer units, two or more conjugated diene monomer units and two or more α,β-ethylenically unsaturated carboxylic ester units.

The term "hydrogenated" denotes that the degree of the hydrogenation of the butadiene units in the hydrogenated nitrile-diene-carboxylic ester copolymer is 50% to 100%, preferably 90% to 100%, particularly preferably 95% to 100% and very particularly preferably 99% to 100%.

α,β-Ethylenically Unsaturated Nitrile

The employed α,β-ethylenically unsaturated nitrile which forms the α,β-ethylenically unsaturated nitrile units (a) may be any known α,β-ethylenically unsaturated nitrile. Preference is given to $(C_3-C_5)$-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles. Particular preference is given to acrylonitrile, methacrylonitrile, ethacrylonitrile or mixtures thereof. Very particular preference is given to acrylonitrile.

The amount of α,β-ethylenically unsaturated nitrile units (a) is typically in the range from 0.1% to 20% by weight, preferably 1% to 19% by weight, particularly preferably from 8% to 18% by weight based on the total amount of 100% by weight of all monomer units of the hydrogenated nitrile-diene-carboxylic ester copolymer.

Conjugated Diene

The conjugated diene which forms the conjugated diene units (b) may be of any nature, in particular conjugated $C_4-C_{12}$ dienes. Particular preference is given to 1,3-butadiene, isoprene, 2,3-dimethylbutadiene, 1,3-pentadiene (piperylene) or mixtures thereof. Especially preferred are 1,3-butadiene and isoprene or mixtures thereof. Very particular preference is given to 1,3-butadiene.

The amount of conjugated diene is typically in the range from 15% to 74.9% by weight, preferably 21% to 73% by weight and particularly preferably 27% to 65% by weight based on the total amount of 100% by weight of all monomer units of the hydrogenated nitrile-diene-carboxylic ester copolymer.

α,β-Ethylenically Unsaturated Carboxylic Ester

In addition to the α,β-ethylenically unsaturated nitrile units and the conjugated diene units the hydrogenated nitrile-diene-carboxylic ester copolymer contains as a third unit at least one α,β-ethylenically unsaturated carboxylic ester unit (c), wherein at least 15% by weight, preferably at least 20% by weight, of the α,β-ethylenically unsaturated carboxylic ester unit (c) based on the total amount of all monomer units of 100% by weight are derived from a PEG acrylate (d) of general formula (I)

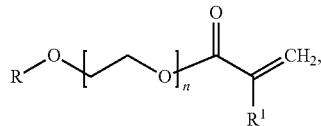

formula (I)

wherein

R is branched or unbranched $C_1-C_{20}$-alkyl, preferably $C_2-C_{20}$-alkyl, particularly preferably ethyl, butyl or ethylhexyl, n is 2 to 12, preferably 2 to 8, particularly preferably 2 to 5 and very particularly preferably 2 or 3 and $R^1$ is hydrogen or $CH_3$—.

The term "(meth)acrylate" represents in the context of the present invention "acrylate" and "methacrylate". When the radical $R^1$ of general formula (I) is $CH_3$ a methacrylate is concerned.

The term "polyethylene glycol" and the abbreviation "PEG" represent in the context of the present invention ethylene glycol sections having two ethylene glycol repeating units (PEG-2; n is 2) to 12 ethylene glycol repeating units (PEG-2 to PEG-12; n is 2 to 12).

The term "PEG acrylate" is also abbreviated to PEG-X-(M)A, wherein "X" represents the number of ethylene glycol repeating units, "MA" represents methacrylate and "A" represents acrylate.

Acrylate units derived from PEG acrylates of general formula (I) are described in the context of the present invention as "PEG acrylate unit" (d).

Preferred PEG acrylate units (d) are derived from the PEG acrylates having the following formulae no. 1 to no. 8, wherein n is 2, 3, 4, 5, 6, 7, 8, 9, 10, 11 or 12, preferably 2, 3, 4, 5, 6, 7 or 8, particularly preferably 2, 3, 4 or 5 and very particularly preferably 2 or 3:

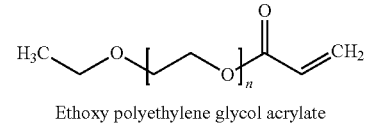

(Formula no. 1)

Ethoxy polyethylene glycol acrylate

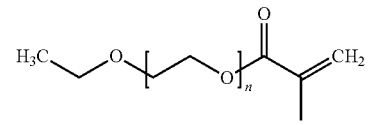

(Formula no. 2)

Ethoxy polyethylene glycol methacrylate

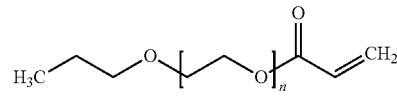

(Formula no. 3)

Propoxy polyethylene glycol acrylate

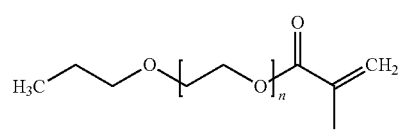

(Formula no. 4)

Propoxy polyethylene glycol methacrylate

-continued

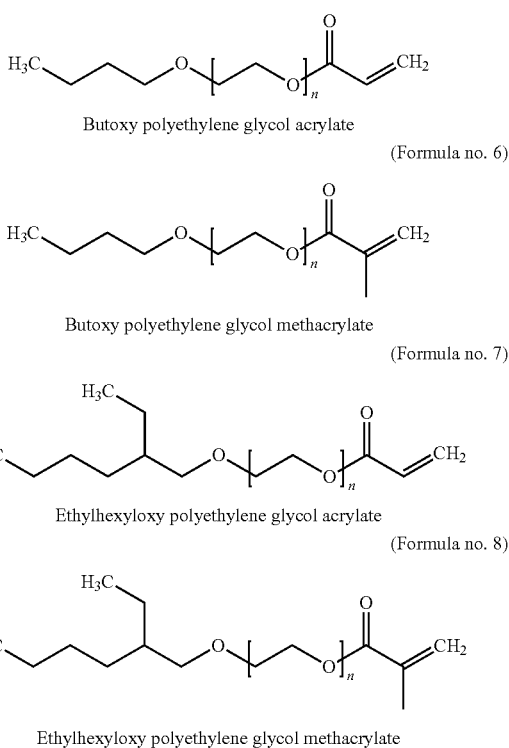

(Formula no. 5)

Butoxy polyethylene glycol acrylate (Formula no. 6)

Butoxy polyethylene glycol methacrylate (Formula no. 7)

Ethylhexyloxy polyethylene glycol acrylate (Formula no. 8)

Ethylhexyloxy polyethylene glycol methacrylate

Other commonly used designations for ethoxy polyethylene glycol acrylate (formula no. 1) are for example poly(ethylene glycol) ethyl ether acrylate, ethoxy PEG acrylate, ethoxy poly(ethylene glycol) monoacrylate or poly(ethylene glycol) monoethyl ether monoacrylate.

These PEG acrylates are commercially available, for example from Arkema under the trade name Sartomer®, from Evonik under the trade name Visiomer® or from Sigma Aldrich.

The amount of the PEG acrylate units (d) in copolymers according to the invention is in the range from 15% to 65% by weight, preferably 20% to 60% by weight and particularly preferably 20% to 55% by weight based on the total amount of 100% by weight of all the monomer units.

In an alternative embodiment the amount of PEG acrylate units (d) is 20% to 60% by weight and the amount of α,β-ethylenically unsaturated carboxylic ester units (c) distinct from the PEG acrylate units (d) is 0% to 40% by weight based on the total amount of 100% by weight of all monomer units, wherein the total amount of carboxylic ester units does not exceed 60% by weight.

The PEG acrylate units (d) accordingly form the α,β-ethylenically unsaturated carboxylic ester units (c) in part or in entirety.

Typical α,β-ethylenically unsaturated carboxylic ester units (c) distinct from the PEG acrylate units (d) are
alkyl, in particular $C_4$-$C_{18}$-alkyl, preferably n-butyl, tert-butyl, n-pentyl or n-hexyl (meth)acrylate;
alkoxyalkyl, in particular $C_4$-$C_{18}$-alkoxyalkyl, preferably $C_4$-$C_{12}$-alkoxyalkyl (meth)acrylate;
hydroxyalkyl, in particular $C_4$-$C_{18}$-hydroxyalkyl, preferably $C_4$-$C_{12}$-hydroxyalkyl (meth)acrylate;
cycloalkyl, in particular $C_5$-$C_{18}$-cycloalkyl, preferably $C_6$-$C_{12}$-cycloalkyl, particularly preferably cyclopentyl (meth)acrylate, cyclohexyl (meth)acrylate, cycloheptyl (meth)acrylate;
alkylcycloalkyl, in particular $C_6$-$C_{12}$-alkylcycloalkyl, preferably $C_7$-$C_{10}$-alkylcycloalkyl, particularly preferably methylcyclopentyl (meth)acrylate and ethylcyclohexyl (meth)acrylate;
aryl, in particular $C_6$-$C_{14}$-aryl monoesters, preferably phenyl (meth)acrylate or benzyl (meth)acrylate;
amino-containing α,β-ethylenically unsaturated carboxylic esters, for example dimethylaminomethyl acrylate or diethylaminoethyl acrylate;
α,β-ethylenically unsaturated monoalkyl dicarboxylates, preferably
alkyl, in particular $C_4$-$C_{18}$-alkyl, preferably n-butyl, tert-butyl, n-pentyl or n-hexyl, particularly preferably mono-n-butyl, maleate, mono-n-butyl fumarate, mono-n-butyl citraconate, mono-n-butyl itaconate, very
alkoxyalkyl, in particular $C_4$-$C_{18}$-alkoxyalkyl, preferably $C_4$-$C_{12}$-alkoxyalkyl,
hydroxyalkyl, in particular $C_4$-$C_{18}$-hydroxyalkyl, preferably $C_4$-$C_{12}$-hydroxyalkyl,
cycloalkyl, in particular $C_5$-$C_{18}$-cycloalkyl, preferably $C_6$-$C_{12}$-cycloalkyl, particularly preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate,
alkylcycloalkyl, in particular $C_6$-$C_{12}$-alkylcycloalkyl, preferably $C_7$-$C_{10}$-alkylcycloalkyl, particularly preferably monomethylcyclopentyl maleate and monoethylcyclohexyl maleate, monomethyl cyclopentyl fumarate and monoethyl cyclohexyl fumarate, monomethyl cyclopentyl citraconate and monoethyl cyclohexyl citraconate; monomethyl cyclopentyl itaconate and monoethylcyclohexyl itaconate;
aryl, in particular $C_6$-$C_{14}$-aryl monoesters, preferably monoaryl maleates, monoaryl fumarates, monoaryl citraconates or monoaryl itaconates, particularly preferably monophenyl maleate or monobenzyl maleate, monophenyl fumarate or monobenzyl fumarate, monophenyl citraconate or monobenzyl citraconate, monophenyl itaconate or monobenzyl itaconate,
unsaturated polyalkyl polycarboxylates, for example dimethyl maleate, dimethyl fumarate, dimethyl itaconate or diethyl itaconate;
or mixtures thereof.

In an alternative embodiment the hydrogenated nitrile-diene-carboxylic ester copolymer according to the invention contains not only the α,β-ethylenically unsaturated nitrile unit (a), the conjugated diene unit (b) and the PEG acrylate unit (d) derived from a PEG acrylate of general formula (I) but also as unsaturated carboxylic ester unit (c) a monoalkyl dicarboxylate unit, preferably monobutyl maleate.

In a preferred hydrogenated nitrile-diene-carboxylic ester copolymer according to the invention the α,β-ethylenically unsaturated nitrile unit (a) is derived from acrylonitrile or methacrylonitrile, particularly preferably from acrylonitrile, the conjugated diene unit (b) is derived from isoprene or 1,3-butadiene, particularly preferably from 1,3-butadiene, and the α,β-ethylenically unsaturated carboxylic ester unit (c) is exclusively a PEG acrylate unit (d) derived from PEG acrylate of general formula (I), wherein n is 2 to 8, particularly preferably from PEG acrylate of general formula (I) where n is 2 or 3, wherein no further carboxylic ester unit (c) is present.

In a further preferred hydrogenated nitrile-diene-carboxylic ester copolymer according to the invention the α,β-ethylenically unsaturated nitrile unit (a) is derived from acrylonitrile or methacrylonitrile, particularly preferably from acrylonitrile, the conjugated diene unit (b) is derived from isoprene or 1,3-butadiene, particularly preferably from 1,3-butadiene, and the α,β-ethylenically unsaturated carboxylic ester unit (c) is derived from a first PEG acrylate of general formula (I), wherein n is 2 to 12, particularly preferably from PEG acrylate of general formula (I) where n is 2 or 3 and an α,β-ethylenically unsaturated carboxylic ester unit (c) distinct from the PEG acrylate units (d).

The hydrogenated nitrile-diene-carboxylic ester copolymer may additionally contain one or more further copolymerizable monomers (e) in an amount of 0% by weight to 20% by weight, preferably 0.1% by weight to 10% by weight, based on the total amount of 100% by weight of all monomer units. The amounts of the remaining monomer units (a), (b), (c) and (d) are then suitably reduced, so that the sum of all monomer units is always 100% by weight. The hydrogenated nitrile-diene-carboxylic ester copolymer may contain as further copolymerizable monomers (e) one or more

- aromatic vinyl monomers, preferably styrene, α-methylstyrene and vinylpyridine,
- fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or else
- α-olefins, preferably $C_2$-$C_{12}$-olefins, for example ethylene, 1-butene, 4-butene, 4-methyl-1-pentene, 1-hexene or 1-octene,
- non-conjugated dienes, preferably $C_4$-$C_{12}$-dienes such as 1,4-pentadiene, 1,4-hexadiene, 4-cyanocyclohexene, 4-vinylcyclohexene, vinylnorbornene, dicyclopentadiene or else
- alkynes such as 1- or 2-butyne,
- α,β-ethylenically unsaturated monocarboxylic acids, preferably acrylic acid, methacrylic acid, crotonic acid or cinnamic acid,
- α,β-ethylenically unsaturated dicarboxylic acids, preferably maleic acid, fumaric acid, citraconic acid, itaconic acid,
- copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or
- crosslinkable monomers, for example divinyl components such as divinylbenzene for example.

In an alternative embodiment the hydrogenated nitrile-diene-carboxylic ester copolymer contains as PEG acrylate units (c) ethoxy, butoxy or ethylhexyloxy polyethylene glycol (meth)acrylate comprising 2 to 12 ethylene glycol repeating units, particularly preferably ethoxy or butoxy polyethylene glycol (meth)acrylate comprising 2 to 5 ethylene glycol repeating units and very particularly preferably ethoxy or butoxy polyethylene glycol (meth)acrylate comprising 2 or 3 ethylene glycol repeating units.

In a further alternative embodiment of the hydrogenated nitrile-diene-carboxylic ester copolymer n is 2 or 3, R is ethyl or butyl and $R^1$ is hydrogen or methyl, preferably n is 2, R is butyl and $R^1$ is methyl.

In a further alternative embodiment the hydrogenated nitrile-diene-carboxylic ester copolymer comprises 8% to 18% by weight of acrylonitrile units, 27% to 65% by weight of 1,3-butadiene units and 27% to 55% by weight of PEG-2 acrylate units or PEG-3 acrylate units.

It is most preferable when the hydrogenated nitrile-diene-carboxylic ester copolymer contains
- 13% to 17% by weight of α,β-ethylenically unsaturated nitrile unit (a), preferably acrylonitrile,
- 36% to 44% by weight of the conjugated diene unit (b), preferably 1,3-butadiene, and
- 43% to 47% by weight of PEG acrylate unit (d), derived from a PEG acrylate of general formula (I), preferably butoxy diethylene glycol methacrylate.

The hydrogenated nitrile-diene-carboxylic ester copolymer according to the invention typically has a number-average molecular weight (Mn) of 10 000 g/mol to 2 000 000 g/mol, preferably 50 000 g/mol to 1 000 000 g/mol, particularly preferably 100 000 g/mol to 500 000 g/mol and very particularly preferably 150 000 g/mol to 300 000 g/mol.

The hydrogenated nitrile-diene-carboxylic ester copolymer according to the invention typically has a polydispersity index (PDI=$M_w/M_n$, wherein $M_w$ is the weight-average molecular weight) of 1.5 to 6, preferably 2 to 5 and particularly preferably 2.5 to 4.

The hydrogenated nitrile-diene-carboxylic ester copolymer according to the invention typically has a Mooney viscosity (ML1+4@100° C.) of 10 to 150, preferably of 20 to 120 and particularly preferably of 25 to 100.

The terpolymers and quaterpolymers according to the invention containing PEG-2-MA repeating units are characterized in that they have a very particularly low gel content.

The hydrogenated nitrile-diene-carboxylic ester copolymer according to the invention is characterized in that it has a glass transition temperature Tg, measured according to DIN 53765, of −40° C. or less.

The hydrogenated nitrile-diene-carboxylic ester copolymer according to the invention is characterized in that it makes it possible to produce vulcanizates in which
- the glass transition temperature Tg, measured according to DIN 53765, has a value of less than −40° C., preferably a value of −44° C. or less and particularly preferably a value of −47° C. or less and
- the swelling in IRM 903, measured according to DIN ISO 1817 for 7 days at 150° C., exhibits a value of 51% or less, preferably a value of 45% or less and particularly preferably a value of 43% or less.

Process for Producing Unhydrogenated Nitrile-Diene-Carboxylic Ester Copolymers

The invention further provides a process for producing unhydrogenated nitrile-diene-carboxylic ester copolymers, characterized in that at least one α,β-ethylenically unsaturated nitrile, at least one conjugated diene and at least one α,β-ethylenically unsaturated carboxylic monoester are subjected to an emulsion polymerization.

The invention preferably provides a process for producing unhydrogenated nitrile-diene-carboxylic ester copolymers, characterized in that 0.1% to 20% by weight, preferably 1% to 19% by weight and particularly preferably 8% to 18% by weight of at least one α,β-ethylenically unsaturated nitrile, 15% to 74.9% by weight, preferably 21% to 73% by weight and particularly preferably 27% to 65% by weight of at least one conjugated diene and 25% to 65% by weight, preferably 26% to 60% by weight and particularly preferably 27% to 55% by weight of at least one α,β-ethylenically unsaturated carboxylic ester, wherein at least 15% by weight, preferably at least 20% by weight, of the α,β-ethylenically unsaturated carboxylic ester based on the total amount of all monomers of 100% by weight are PEG acrylate of general formula (I)

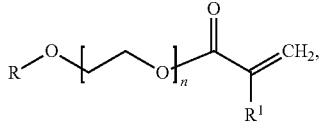

formula (I)

wherein
R is branched or unbranched $C_1$-$C_{20}$-alkyl, preferably $C_2$-$C_{20}$-alkyl, particularly preferably ethyl, butyl or ethylhexyl,
n is 2 to 12, preferably 2 to 8, particularly preferably 2 to 5 and very particularly preferably 2 or 3 and
$R^1$ is hydrogen or $CH_3$—,
are subjected to an emulsion polymerization.

The production of the unhydrogenated nitrile-diene-carboxylic ester copolymers required for the hydrogenation as an intermediate may be effected by polymerization of the abovementioned monomers and has been described extensively in the literature (e.g. Houben-Weyl, Methoden der Organischen Chemie, vol. 14/1, 30 Georg Thieme Verlag Stuttgart 1961) and is not particularly restricted. It is generally a process in which α,β-ethylenically unsaturated nitrile units, conjugated diene units and PEG acrylate units are copolymerized as desired. The polymerization process used may be any known emulsion polymerization process, suspension polymerization process, bulk polymerization process and solution polymerization process. Preference is given to the emulsion polymerization process. Emulsion polymerization is to be understood as meaning especially a process known per se in which the reaction medium used is usually water (see, inter alia, Römpp Lexikon der Chemie, volume 2, 10th edition 1997; P. A. Lovell, M. S. El-Aasser, Emulsion Polymerization and Emulsion Polymers, John Wiley & Sons, ISBN: 0471 96746 7; H. Gerrens, Fortschr. Hochpolym. Forsch. 1, 234 (1959)). The incorporation rate of the termonomer may readily be adjusted by the person skilled in the art such that an inventive terpolymer is obtained. The monomers may be initially charged or reacted by incrementation in two or more steps.

The invention accordingly also provides the unhydrodenated nitrile-diene-carboxylic ester copolymers which are necessary for production of the hydrogenated nitrile-diene-carboxylic ester copolymers according to the invention and contain
(a) 0.1% to 20% by weight, preferably 1% to 19% by weight and particularly preferably 8% to 18% by weight of at least one α,β-ethylenically unsaturated nitrile unit,
(b) 15% to 74.9% by weight, preferably 21% to 73% by weight and particularly preferably 27% to 65% by weight of at least one conjugated diene unit and
(c) 25% to 65% by weight, preferably 26% to 60% by weight and particularly preferably 27% to 55% by weight of at least one α,β-ethylenically unsaturated carboxylic ester unit,
wherein at least 15% by weight, preferably at least 20% by weight, of the α,β-ethylenically unsaturated carboxylic ester units (c) based on the total amount of all monomer units of 100% by weight are derived from a PEG acrylate (d) of general formula (I)

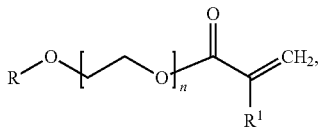

formula (I)

wherein
R is branched or unbranched $C_1$-$C_{20}$-alkyl, preferably $C_2$-$C_{20}$-alkyl, particularly preferably ethyl, butyl or ethylhexyl,
n is 2 to 12, preferably 2 to 8, particularly preferably 2 to 5 and very particularly preferably 2 or 3 and
$R^1$ is hydrogen or $CH_3$—,
and for the use thereof for production of hydrogenated nitrile-diene-carboxylic ester copolymers.

Metathesis and/or Hydrogenation:

It is also possible for the production of the unhydrogenated nitrile-diene-carboxylic ester copolymer to be followed by a metathesis reaction for reduction of the molecular weight of the nitrile-diene-carboxylic ester copolymer or a metathesis reaction and a subsequent hydrogenation or a hydrogenation only. These metathesis or hydrogenation reactions are well known to those skilled in the art and are described in the literature. Metathesis is disclosed in WO-A-02/100941 and WO-A-02/100905 for example and may be used for molecular weight reduction.

Process for Producing Hydrogenated Nitrile-Diene-Carboxylic Ester Copolymers

The invention also provides a process for producing hydrogenated nitrile-diene-carboxylic ester copolymers, characterized in that at least one α,β-ethylenically unsaturated nitrile, at least one conjugated diene and at least one PEG acrylate of general formula (I) are subjected to an emulsion polymerization and subsequently hydrogenated.

Following the copolymerization of the unhydrogenated nitrile-diene-carboxylic ester copolymers said copolymers are at least partially hydrogenated (hydrogen addition reaction). In the at least partially hydrogenated nitrile-diene copolymers at least a portion of the C=C double bonds of the repeating unit derived from the conjugated diene is specifically hydrogenated. The degree of hydrogenation of the conjugated diene units (b) in hydrogenated nitrile-diene-carboxylic ester copolymers according to the invention is 50% to 100%, preferably 90% to 100% and particularly preferably 99% to 100%.

The term "hydrogenated nitrile-diene-carboxylic ester copolymer" is thus to be understood as meaning in the context of the present invention a copolymer containing at least one α,β-ethylenically unsaturated nitrile monomer unit, at least one conjugated diene monomer unit and at least one α,β-ethylenically unsaturated carboxylic ester unit, wherein the conjugated diene units are hydrogenated to an extent of 50% to 100%, preferably 90% to 100% and particularly preferably 99% to 100%.

The hydrogenation of nitrile-diene copolymers is known, for example from U.S. Pat. No. 3,700,637, DE-A-2 539 132, DE-A-3 046 008, DE-A-3 046 251, DE-A-3 227 650, DE-A-3 329 974, EP-A-111 412, FR-B 2 540 503. Hydrogenated nitrile-diene copolymers feature not only high breaking strength, low abrasion, consistently low deformation after compressive and tensile stress and good oil resistance but also in particular remarkable stability to thermal and oxidative influences.

Vulcanizable Mixtures Containing Hydrogenated Nitrile-Diene-Carboxylic Ester Copolymers The present invention further provides vulcanizable mixtures containing hydrogenated nitrile-diene-carboxylic ester copolymers and at least one crosslinker. In a preferred embodiment vulcanizable mixtures additionally containing at least one filler are concerned.

Suitable crosslinkers include for example peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butylperoxponyl valerate, dicumyl peroxide, 2,5-dimethyl-2,5-di(t-butylperoxy)hexane, tert-butylcumyl peroxide, 1,3-bis(t-butylperoxyisopropyl)benzene, di-t-butyl peroxide and 2,5-dimethyl-2,5-di(t-butylperoxy)-hex-3-yne.

It may be advantageous to use not only these peroxidic crosslinkers but also further additions by means of which the crosslinking yield may be increased: Suitable examples thereof include triallyl isocyanurate, triallyl cyanurate, trimethylolpropane tri(meth)acrylate, triallyltrimellitate, ethylene glycol dimethacrylate, butanediol dimethacrylate, zinc diacrylate, zinc dimethacrylate, 1,2-polybutadiene or N,N"-m-phenylenebismaleimide.

The total amount of the peroxidic crosslinker(s) is typically in the range from 1 to 20 phr, preferably in the range from 1.5 to 15 phr and particularly preferably in the range from 2 to 10 phr based on the hydrogenated nitrile-diene-carboxylic ester copolymer.

Employable crosslinkers also include sulfur in elemental soluble or insoluble form or sulfur donors.

Suitable sulfur donors include for example dimorpholyl disulfide (DTDM), 2-morpholinodithiobenzothiazole (MBSS), caprolactam disulfide, dipentamethylenethiuram tetrasulfide (DPTT) and tetramethylthiuram disulfide (TMTD).

It is also possible in the sulfur vulcanization of the hydrogenated nitrile-diene-carboxylic ester copolymer according to the invention to use further additions by means of which the crosslinking yield may be increased. In principle, the crosslinking can also be effected with sulfur or sulfur donors alone.

Conversely, however, the crosslinking of the hydrogenated nitrile-diene-carboxylic ester copolymers of the invention may also be effected only in the presence of the abovementioned additions, i.e. without addition of elemental sulfur or sulfur donors.

Suitable additions by means of which the crosslinking yield may be increased include for example dithiocarbamates, thiurams, thiazoles, sulfenamides, xanthogenates, guanidine derivatives, caprolactams and thiourea derivatives.

Employable dithiocarbamates include for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate. Employable thiurams include for example: tetramethylthiuram disulfide (TMTD), tetramethylthiuram monosulfide (TMTM), dimethyldiphenylthiuram disulfide, tetrabenzylthiuram disulfide, dipentamethylenethiuram tetrasulfide and tetraethylthiuram disulfide (TETD). Employable thiazoles include for example: 2-mercaptobenzothiazole (MBT), dibenzothiazyl disulfide (MBTS), zinc mercaptobenzothiazole (ZMBT) and copper 2-mercaptobenzothiazole. Employable sulfenamide derivatives include for example: N-cyclohexyl-2-benzothiazylsulfenamide (CBS), N-tert-butyl-2-benzothiazylsulfenamide (TBBS), N,N'-dicyclohexyl-2-benzothiazylsulfenamide (DCBS), 2-morpholinothiobenzothiazole (MBS), N-oxydiethylenethiocarbamyl-N-tert-butylsulfenamide and oxydiethylenethiocarbamyl-N-oxyethylenesulfenamide. Employable xanthogenates include for example: sodium dibutylxanthogenate, zinc isopropyldibutylxanthogenate and zinc dibutylxanthogenate. Employable guanidine derivatives include for example: diphenylguanidine (DPG), di-o-tolylguanidine (DOTG) and o-tolylbiguanide (OTBG). Employable dithiophosphates include for example: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulfide. A caprolactam used may be, for example, dithiobiscaprolactam. Employable thiourea derivatives include for example N,N'-diphenylthiourea (DPTU), diethylthiourea (DETU) and ethylenethiourea (ETU). Likewise suitable as additions are, for example: zinc diaminediisocyanate, hexamethylenetetramine, 1,3-bis(citraconimidomethyl)benzene and cyclic disulfanes.

The recited additions and the crosslinking agents may be used either individually or in mixtures. It is preferable to employ the following substances for the crosslinking of the hydrogenated nitrile-diene-carboxylic ester copolymers: sulfur, 2-mercaptobenzothiazole, tetramethylthiuram disulfide, tetramethylthiuram monosulfide, zinc dibenzyldithiocarbamate, dipentamethylenethiuram tetrasulfide, zinc dialkyldithiophosphate, dimorpholyl disulfide, tellurium diethyldithiocarbamate, nickel dibutyldithiocarbamate, zinc dibutyldithiocarbamate, zinc dimethyldithiocarbamate and dithiobiscaprolactam.

The crosslinking agents and abovementioned additions may each be employed in amounts of 0.05 phr to 10 phr, preferably 0.1 phr to 8 phr, in particular 0.5 phr to 5 phr (single metered addition, in each case based on the active substance), based on the hydrogenated nitrile-diene-carboxylic ester copolymer.

In the sulfur crosslinking it may also be advantageous, in addition to the crosslinking agents and the abovementioned additions, to also co-use further inorganic or organic substances, for example: zinc oxide, zinc carbonate, lead oxide, magnesium oxide, calcium oxide, saturated or unsaturated organic fatty acids and zinc salts thereof, polyalcohols, amino alcohols, for example triethanolamine, and amines, for example dibutylamine, dicyclohexylamine, cyclohexylethylamine, polyamines and polyether amines.

Other Optional Components:

Such vulcanizable mixtures may optionally also comprise one or more additives and fibre materials familiar to the person skilled in the art for rubbers. These comprise ageing stabilizers, reversion stabilizers, light stabilizers, ozone stabilizers, processing aids, mould release agents, plasticizers, mineral oils, tackifiers, blowing agents, dyes, pigments, waxes, resins, extenders, fillers, for example barium sulfate, titanium dioxide, zinc oxide, calcium oxide, calcium carbonate, magnesium oxide, aluminium oxide, iron oxide, aluminium hydroxide, magnesium hydroxide, aluminosilicates, diatomaceous earth, talc, kaolins, bentonites, carbon nanotubes, graphene, Teflon (the latter preferably in powder form) or silicates, carbon blacks, silicas, pyrogenic silica, silica, silanized silica, natural products, for example alumina, kaolins, wollastonite, organic acids, vulcanization retarders, metal oxides, strength members (fibres) made of glass, cords, fabrics, fibres made of aliphatic and aromatic polyamides (Nylon®, Aramid®), polyesters and natural fibre products, salts of unsaturated carboxylic acids, for example zinc diacrylate (ZDA), zinc methacrylates (ZMA) and zinc dimethacrylate (ZDMA), liquid acrylates or other additives known in the rubber industry (Ullmann's Encyclopedia of Industrial Chemistry, VCH Verlagsgesellschaft mbH, D-69451 Weinheim, 1993, vol A 23 "Chemicals and Additives", pp 366-417).

Contemplated filler activators include in particular organic silanes, for example vinyltrimethyloxysilane, vinyldimethoxymethylsilane, vinyltriethoxysilane, vinyltris (2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 parts by weight based on 100 parts by weight of the nitrile rubber.

The total amount of additives and fibre materials is typically in the range from 1 to 300 parts by weight based on 100 parts by weight of the nitrile rubber.

Process for Producing Vulcanizable Mixtures Containing Hydrogenated Nitrile-Diene-Carboxylic Ester Copolymers The invention further provides a process for producing vulcanizable mixtures containing hydrogenated nitrile-diene-carboxylic ester copolymers by mixing the hydrogenated nitrile-diene-carboxylic ester copolymer with at least one crosslinker and the optionally further components present. This mixing operation may be performed in any mixing units customary in the rubber industry, for example internal mixers, Banbury mixers or rollers. The sequence of metered addition may be readily determined by the person skilled in the art through suitable tests.

Two possible procedural variants are set out hereinbelow by way of example:

Process A: Production in an Internal Mixer

Internal Mixers Having an Intermeshing Rotor Geometry are Preferred.

At the time of commencement, the internal mixer is charged with the hydrogenated nitrile-diene-carboxylic ester copolymer in bale form, and the bales are comminuted. After a suitable mixing period, the fillers and additives are added. The mixing is effected under temperature control, with the proviso that the mixture remains at a temperature in the range from 80° C. to 150° C. for a suitable time. After a further suitable mixing period, the further mixture constituents are added, such as optionally stearic acid, antioxidants, plasticizers, white pigments (for example titanium dioxide), dyes and other processing actives. After a further suitable mixing period, the internal mixer is vented and the shaft is cleaned. After a further suitable period, the internal mixer is emptied to obtain the vulcanizable mixture. Suitable periods are understood to mean a few seconds to a few minutes. The crosslinking chemicals may either be incorporated in a separate step on a roller, especially when mixing is performed at an elevated mixing temperature, or co-added directly in the internal mixer. It must be ensured in this case that the mixing temperature is below the reaction temperature of the crosslinking chemicals.

The vulcanizable mixtures thus produced can be assessed in a customary manner, for instance by Mooney viscosity, by Mooney scorch or by a rheometer test.

Process B: Production on a Roller

When rollers are used as mixing units the hydrogenated nitrile-diene-carboxylic acid copolymer is fed onto the roller first. Once a homogeneous milled sheet has been formed the fillers, plasticizers and other additives with the exception of the crosslinking chemicals are added. After incorporation of all components, the crosslinking chemicals are added and incorporated. The mixture is then incised three times on the right and three times on the left and doubled over 5 times. The finished milled sheet is rolled to the desired thickness and subjected to further processing according to the desired test methods.

Process for Producing Vulcanizates Containing Hydrogenated Nitrile-Diene-Carboxylic Ester Copolymers The invention further provides the process for producing vulcanizates, preferably as mouldings, containing hydrogenated nitrile-diene-carboxylic ester copolymers (vulcanization), characterized in that it comprises subjecting the vulcanizable mixture containing hydrogenated nitrile-diene-carboxylic ester copolymers to a vulcanization, preferably in a moulding process and more preferably at temperatures in the range from 100° C. to 250° C., particularly preferably at temperatures in the range from 120° C. to 250° C. and very particularly preferably temperatures in the range from 130° C. to 250° C. To this end the vulcanizable mixtures are subjected to further processing with calenders, rollers or extruders. The preformed mass is then vulcanized in presses, autoclaves, hot air systems or in so-called automatic mat vulcanization plants ("Auma"), wherein temperatures in the range from 100° C. to 250° C. have proven preferred, temperatures in the range from 120° C. to 250° C. have proven particularly preferred and temperatures in the range from 130° C. to 250° C. have proven very particularly preferred. The vulcanization time is typically 1 minute to 24 hours and preferably 2 minutes to 1 hour. Depending on the shape and size of the vulcanizates, a second vulcanization by reheating may be necessary to achieve complete vulcanization.

The invention further provides the thus obtainable vulcanizates based on hydrogenated nitrile-diene-carboxylic ester copolymers according to the invention.

The invention also provides for the use of the vulcanizates based on hydrogenated nitrile-diene-carboxylic ester copolymers according to the invention for producing mouldings selected from the group consisting of belts, seals, rollers, shoe components, hoses, clamping elements, stators and cable sheaths, preferably belts and seals.

The invention accordingly provides vulcanizates as mouldings based on hydrogenated nitrile-diene-carboxylic ester copolymers according to the invention which are preferably selected from belts, seals, rollers, shoe components, hoses, clamping elements, stators and cable sheaths, particularly preferably belts and seals. The methods employable to this end by way of example such as moulding, injection moulding or extrusion processes and the corresponding injection moulding apparatuses or extruders are well known to those skilled in the art. In the production of these mouldings the hydrogenated nitrile-diene-carboxylic ester copolymers according to the invention may be supplemented with the standard auxiliaries known to those skilled in the art and suitably selectable using their customary knowledge of the art, for example fillers, filler activators, accelerators, crosslinkers, antiozonants, antioxidants, processing oils, extender oils, plasticizers, activators or scorch inhibitors.

The advantage of the invention is in particular that the hydrogenated nitrile-diene-carboxylic ester copolymers are suitable for producing vulcanizates having a Tg of less than −40° C. and a swelling of 51% or less and are accordingly superior to vulcanizates based on the known HNBR copolymers.

EXAMPLES

Methods of Measurement:

The RDB content (residual double bond content) in % is determined by the following FT-IR measurement: The IR spectra of the hydrogenated nitrile-diene-carboxylic ester copolymer before, during and after the hydrogenation are recorded by means of an AVATAR 360 Thermo Nicolet FT-IR spectrometer IR instrument. To this end a monochlorobenzene solution of the hydrogenated nitrile-diene-carboxylic ester copolymer is applied to an NaCl platelet, dried to a film and analysed. The degree of hydrogenation is determined by FT-IR analysis according to the ASTM D 567095 method.

Mooney viscosity values (ML1+4@100° C.) are in each case determined by means of a shearing disc viscometer according to ASTM D1646-07.

Molecular weight is determined by gel permeation chromatography (GPC). A modular system comprising a Shodex RI-71 differential refractometer, S 5200 autosampler (from SFD), column oven (ERC-125), Shimadzu LC 10 AT pump and a column combination of 3 PLgel 10 μm Mixed B 300×7.5 mm columns from Agilent was used. The solvent used was tetrahydrofuran; the molecular weights present are based on polystyrene standards from PSS (Mainz). The finished THF sample solutions are filtered through syringe filters having 0.45 μm PTFE membranes and diameter 25 mm. The measurements were conducted at 40° C. and a flow rate of 1 ml/min in tetrahydrofuran.

The molecular parameters such as number-average molecular weight $M_n$, mass-average molecular weight $M_w$ and the resulting polydispersity index PDI are determined from the RI signal by means of the "Empower 2 data base" software from Waters.

The nitrogen content for determining ACN content in the copolymer rubbers containing nitrile groups is determined by Vario EL cube. Combustion of the amount weighed out in the CHN machine at about 1150° C. in the presence of oxidation catalysts and oxygen, aliquoting of the combustion gases, absorption of the disruptive components and detection of $N_2$ by thermal conductivity measurement cell (TCD).

The microstructure and the termonomer content of the individual polymers were determined by means of $^1$H-NMR (instrument: Bruker DPX400 with TopSpin 1.3 software, measurement frequency 400 MHz, solvent 1,1,2,2-tetrachloroethane-d2).

The glass transition temperature was obtained by means of a DSC measurement according to ASTM E 1356-03 or according to DIN 53765. For this purpose, between 10 mg and 15 mg of the sample were weighed into an aluminium boat and sealed. The boat was heated twice from −150° C. to 150° C. at a heating rate of 10 K/min in a DSC instrument from TA Instruments. The glass transition temperature was determined from the second heating curve by the standard mean value method.

Swelling: To determine swelling dumbbell-shaped test specimens as used for tensile testing were stored in IRM903 according to DIN ISO 1817 at 150° C. for 168 h. The samples were then measured and weighed and the volume swelling and mass increase determined. Subsequently, tensile strength and elongation were determined to ASTM D2240-81.

The following substances were employed in the examples:

The following chemicals were purchased as commercial products from the companies specified in each case or originate from production plants of the companies specified. For the Polymerization:

| | |
|---|---|
| MEA | methoxyethyl acrylate, molecular weight 130.14 g/mol, Alfa Aesar |
| BA | butyl acrylate, molecular weight 128.17 g/mol, Sigma-Aldrich |
| PEG-2-MA | butoxy diethylene glycol methacrylate (BDGMA), molecular weight 230.3 g/mol, Evonik Industries AG |
| PEG-3-MA | ethoxy triethylene glycol methacrylate, molecular weight 246.3 g/mol, Evonik Industries AG |
| Disponil ® SDS G | sodium lauryl sulfate; BASF |
| Na salt of disproportionated rosin acid $Na_2CO_3$ | CAS 61790-51-0 Merck KGaA |
| t-DDM | tertiary dodecyl mercaptan; LANXESS Deutschland GmbH |
| Glidox ® 500 | pinane hydroperoxide; Renessenz |
| "Premix solution Fe(II)$SO_4$" | contains 0.986 g of Fe(II)$SO_4$*7$H_2$O and 2.0 g of Rongalit ® C in 400 g of water |
| Rongalit C ® | sodium salt of a sulfinic acid derivative; commercial product from BASF |
| diethylhydroxylamine | Merck KGaA |
| Vulkanox ® BKF | 2,2'-methylenebis(4-methyl-6-tert-butylphenol); LANXESS Deutschland GmbH |

Substances Used in the Vulcanizable Composition:

| | |
|---|---|
| Corax ® N330 | carbon black; Orion Engineered Carbons |
| Rhenofit ® DDA | 70% masterbatch based on octylated diphenylamine; Rheinchemie |
| Vulkanox ® ZMB2/C5 | zinc salt of 4- and 5-methyl-2-mercaptobenzothiazole; LANXESS Deutschland GmbH |
| Maglite ® | magnesium oxide; CP Hall. |
| TAIC | triallyl isocyanurate, 70% masterbatch; Chemie GmbH & Co KG. |
| Perkadox ® 14-40 | di(tert-butylperoxyisopropyl)benzene 40% supported on silica; Akzo Nobel Polymer Chemicals BV |

[Production of the Unhydrogenated Nitrile-Diene-Carboxylic Ester Copolymers (NBR 1-8]

NBR copolymers 1 to 8 as used in the example series which follow were produced according to the base formulation specified in Table 1, wherein all feedstocks are stated in % by weight based on 100% by weight of the monomer mixture. Table 1 also gives the particular polymerization conditions (temperature, conversion and time).

or 2.5 kg (NBR 2, NBR 4) or 2.1 kg (NBR 6, NBR 7 and NBR 8) or 1.94 kg (NBR 5) and EDTA in an equimolar amount based on the Fe-II were used. Of this water amount 7.2 kg (NBR 1) or 7.06 kg (NBR 3) or 2.25 kg (NBR 2, NBR 4) or 1.85 kg (NBR 6 and NBR 7) or 1.81 kg (NBR 8) or 1.75 kg (NBR 5) are initially charged into the autoclave with the emulsifier and purged with a nitrogen stream. The initial monomers and the amount of the molecular weight regulator

TABLE 1

Production of the unhydrogenated nitrile-diene-carboxylic ester copolymers (NBR 1-8; inventive examples are denoted with an asterisk *).

| | NBR | | | | | | | |
|---|---|---|---|---|---|---|---|---|
| | 1 | 2 | 3* | 4* | 5* | 6* | 7* | 8* |
| Monomers | | | | | | | | |
| Acrylonitrile (ACN) | 17 | 18 | 14 | 18 | 12 | 15 | 17 | 17 |
| 1,3-Butadiene (BD) | 35 | 42 | 35 | 31 | 30 | 32 | 25 | 32 |
| Butyl acrylate (BA) | 48 | | | | 17.4 | 28 | 13 | 24 |
| Methoxyethyl acrylate (MEA) | | 40 | | | | | | |
| Butoxy diethylene glycol methacrylate (PEG-2-MA) | | | | 51 | | | | |
| Ethoxy triethylene glycol methacrylate (PEG-3-MA) | | | 51 | | 40.6 | 25 | 45 | 27 |
| Total water amount | 190 | 190 | 190 | 190 | 190 | 190 | 190 | 190 |
| Disponil ® SDS G | 1.8 | 2.4 | | 2.4 | | | | |
| Na salt of disproportionated rosin acid | 0.5 | 0.5 | | 0.5 | | | | |
| Na$_2$CO$_3$ | 0.12 | 0.12 | | 0.12 | | | | |
| Fatty acid | | | 2.6 | | 2.6 | 2.2 | 2.2 | 2.4 |
| pH | 7.5 ± 0.5 | 7.5 ± 0.5 | 11.5 ± 0.5 | 7.5 ± 0.5 | 11.5 ± 0.5 | 11.5 ± 0.5 | 11.5 ± 0.5 | 11.5 ± 0.5 |
| t-DDM | 0.29 | 0.55 | 0.5 | 0.15 | 0.35 | 0.36 | 0.3 | 0.34 |
| Glidox ® 500 | 0.02 | 0.02 | 0.02 | 0.02 | 0.02 | 0.02 | 0.02 | 0.02 |
| Premix solution FeSO$_4$ | 0.024 | 0.023 | 0.045 | 0.0315 | 0.035 | 0.0249 | 0.0156 | 0.0135 |
| Diethylhydroxylamine | 0.2 | 0.2 | 0.2 | 0.2 | 0.2 | 0.2 | 0.2 | 0.2 |
| Vulkanox ® BKF | 0.1 | 0.1 | 0.1 | 0.1 | 0.1 | 0.1 | 0.1 | 0.1 |
| Polymerization conditions | | | | | | | | |
| Polymerization temperature [° C.] | 12 | 12 | 12 | 12 | 12 | 12 | 12 | 12 |
| Polymerization conversion [%] | 75.3 | 73.4 | 78.7 | 75.4 | 72.9 | 73.1 | 73.5 | 75 |
| Polymerization time [h] | 6.13 | 7 | 7.5 | 7.5 | 6.33 | 4.13 | 6 | 4.5 |

TABLE 2

Addition of the increments of the nitrile-diene-carboxylic ester copolymers (NBR 1-8)
Addition of the increments of the monomers was effected at the reported monomer conversions ±5%.

| | NBR | | | | | | | |
|---|---|---|---|---|---|---|---|---|
| | 1 | 2 | 3* | 4* | 5* | 6* | 7* | 8* |
| Conversion [%] | ACN (a)/BD (b)/termonomer (c)/BA (c) [% by weight] | | | | | | | |
| 21 | 3/7/—/— | —/—/—/— | —/—/—/— | 2/4/—/— | 2/5/2.8/1.2 | 3/6/—/— | 3/5/—/— | 3/6/—/— |
| 33 | —/—/—/— | 3/—/—/— | 3/—/16/— | —/—/—/— | 2/5/2.8/1.2 | —/—/—/— | —/—/—/— | —/—/—/— |
| 42 | 3/7/—/— | —/—/—/— | —/—/—/— | 2/4/—/— | 2/5/2.8/1.2 | 3/6/—/— | 3/4/—/— | 3/5/—/— |
| 63 | 3/6/—/— | —/—/—/— | —/—/—/— | 2/3/—/— | 2/3/2.8/1.2 | 3/5/—/— | 3/4/—/— | 3/5/—/— |

Production of the nitrile-diene-carboxylic ester copolymers was effected in discontinuous fashion in a 20 l autoclave (NBR 1 and NBR 3) or 5 l autoclave (NBR 2, NBR 4, NBR 5, NBR 6, NBR 7 and NBR 8) having a stirring means. For the autoclave batches 5.3 kg (NBR1) or 5.2 kg (NBR3) or 1.3 kg (NBR 2, NBR 4, NBR 6, NBR 7 and NBR 8) or 1.25 kg (NBR 5) respectively of the monomer mixture and a total water amount of 9.2 kg (NBR 1) or 7.6 kg (NBR 3) t-DDM specified in Table 1 were then added and the reactor sealed. Once the reactor contents had been thermostatted the polymerizations were initiated by addition of the premix solutions and of pinane hydroperoxide (Glidox® 500).

The progress of the polymerization was monitored by gravimetric conversion determinations. Upon attainment of the conversions reported in Table 1 the polymerization was terminated by adding an aqueous solution of diethylhydroxylamine. Unconverted monomers and other volatile constituents were removed by means of steam distillation.

Before coagulation of the respective NBR latex said latex was admixed with a 45% dispersion of Vulkanox® BKF (0.1% by weight of Vulkanox® BKF based on NBR solids). The mixture was then coagulated with $CaCl_2$, washed and the crumb obtained was dried.

The dried NBR rubbers were characterized by Mooney viscosity, ACN content and glass transition temperature and the content of termonomers was determined by $^1$H-NMR analysis (Table 3).

Co-catalyst: triphenylphosphine: 5.18 g (1.0 phr)
Hydrogen pressure (p $H_2$): 8.4 MPa
Stirrer speed: 600 rpm The NBR-containing polymer solution is degassed three times with $H_2$ (23° C., 2 MPa) with vigorous stirring. The temperature of the reactor was raised to 100° C. and the $H_2$ pressure raised to 6 MPa. 123.9 g of a chlorobenzene solution consisting of Wilkinson catalyst (0.337 g) and triphenylphosphine (5.18 g) were added and the pressure was raised to 8.4 MPa while the reactor temperature was adjusted to 137-140° C. Both parameters were kept constant

TABLE 3

Composition of the unhydrogenated nitrile-diene-carboxylic ester copolymers NBR 1-8 (monomer amounts incorporated by polymerization given in % by weight; inventive examples denoted with an asterisk *)

|  |  | NBR |  |  |  |  |  |  |  |
|---|---|---|---|---|---|---|---|---|---|
|  |  | 1 | 2 | 3* | 4* | 5* | 6* | 7* | 8* |
| ACN (a) | [% by weight] | 16.4 | 19.7 | 13.3 | 14.8 | 10 | 12.9 | 14 | 15.5 |
| BD (b) | [% by weight] | 48.8 | 52.7 | 41 | 38.6 | 41.5 | 43.1 | 45.5 | 47.2 |
| BA (c) | [% by weight] | 34.8 |  |  |  | 14.3 | 21.2 | 11.1 | 17 |
| MEA (c) | [% by weight] |  | 27.6 |  |  |  |  |  |  |
| PEG-2-MA (d) | [% by weight] |  |  |  | 46.6 |  |  |  |  |
| PEG-3-MA (d) | [% by weight] |  |  | 45.7 |  | 34.2 | 22.8 | 29.4 | 20.3 |
| Mooney viscosity ML(1 + 4 @100° C.) | MU | 33 | 23 | 23 | 25 | 16 | 32 | 29 | 46 |

II Production of the Hydrogenated Nitrile-Diene-Carboxylic Ester Copolymers HNBR 1 to 8

Procedure for Hydrogenations

The hydrogenations which follow were performed using the previously synthesized unhydrogenated nitrile-diene-carboxylic ester copolymers (NBR 1 to 8).

Dry monochlorobenzene (MCB) was sourced from VWR, Wilkinson catalyst from Materia Inc. and triphenylphosphine from VWR, and employed as obtained. The results of the hydrogenation experiments are summarized in Table 4.

Hydrogenations 1-8 were performed in a 10 l high-pressure reactor under the following conditions:
  Solvent: monochlorobenzene
  Solids concentration: 12-13% by weight of NBR terpolymer in MCB (518 g)
  Reactor temperature: 137-140° C.
  Reaction time: up to 4 hours
  Catalyst & loading: Wilkinson catalyst: 0.337 g (0.065 phr);

during the reaction. The progress of the reaction was monitored by measurement of the residual double bond content (RDB) of the unhydrogenated nitrile-diene-carboxylic ester copolymer by IR spectroscopy. The reaction was terminated after not more than 4 hours and/or attainment of an RDB content of <1% by releasing the hydrogen pressure.

The thus formed hydrogenated nitrile-diene-carboxylic ester copolymer was isolated from the solution by steam coagulation. To this end, the chlorobenzene solution was diluted to a polymer content of 7% by weight and continuously metered into a stirred, water-filled glass reactor preheated to 100° C. At the same time, 0.5 bar steam was introduced into the coagulation water. The thus precipitated polymer crumb was roughly dewatered and then dried to constant weight at 55° C. under reduced pressure.

TABLE 4

Composition and properties of the hydrogenated nitrile-diene-carboxylic ester copolymers (HNBR 1 to 8) (inventive examples are denoted with an asterisk *)

|  |  | HNBR |  |  |  |  |  |  |  |
|---|---|---|---|---|---|---|---|---|---|
|  |  | 1 | 2 | 3* | 4* | 5* | 6* | 7* | 8* |
| ACN (a) | [% by weight] | 16.4 | 19.7 | 13.3 | 14.8 | 10 | 12.9 | 14 | 15.5 |
| BD (b) | [% by weight] | 48.8 | 52.7 | 41 | 38.6 | 41.5 | 43.1 | 45.5 | 47.2 |

TABLE 4-continued

Composition and properties of the hydrogenated nitrile-diene-carboxylic ester copolymers (HNBR 1 to 8) (inventive examples are denoted with an asterisk *)

| | | HNBR | | | | | | | |
|---|---|---|---|---|---|---|---|---|---|
| | | 1 | 2 | 3* | 4* | 5* | 6* | 7* | 8* |
| BA (c) | [% by weight] | 34.8 | | | | 14.3 | 21.2 | 11.1 | 17 |
| (MEA (c) | [% by weight] | | 27.6 | | | | | | |
| PEG-2-MA (d) | [% by weight] | | | | 46.6 | | | | |
| PEG-3-MA (d) | [% by weight] | | | 45.7 | | 34.2 | 22.8 | 29.4 | 20.3 |
| RDB content | [%] | <0.9 | <0.5 | 9 | 0.8 | <0.5 | <0.5 | <0.5 | 0.8 |
| Mooney viscosity ML(1 + 4 @100° C.) | MU | 70 | 22 | 37 | 127 | 48 | 71 | 68 | 91 |
| Glass transition temp. (Tg) crude polymer | [° C.] | −39 | −36 | −45 | −47 | −49 | −47 | −45 | −43 |

The hydrogenated nitrile-diene-carboxylic ester copolymers according to the invention feature a glass transition temperature Tg of −40° C. or less.

III Production of Vulcanizates of the Hydrogenated Nitrile-Diene-Carboxylic Ester Copolymers (HNBR V1 to V8):

Production of the Vulcanizable Mixtures:

All the rubber mixtures were produced on a mixing roll mill. The diameter of the rollers was 80 mm, the length 200 mm. The rollers were preheated to 40° C., the speed of the front roller was 16.5 rpm and that of the rear roller was 20 rpm, thereby achieving a friction of 1:1.2.

The rubber was initially charged and mixed for one (1) minute until a smooth milled sheet had formed. Subsequently, first the carbon black, then the additives and finally the crosslinking chemicals were incorporated. The total mixing time was 5 to 8 minutes.

TABLE 5

Composition and properties of the vulcanizate (HNBR V1 to V8; inventive examples are denoted with an asterisk *).

| | Example | | | | | | | |
|---|---|---|---|---|---|---|---|---|
| | V1 | V2 | V3* | V4* | V5* | V6* | V7* | V8* |
| HNBR copolymer composition | % by weight | % by weight | % by weight | % by weight | % by weight | % by weight | % by weight | % by weight |
| ACN (a) | 16.4 | 19.7 | 13.3 | 14.8 | 10 | 12.9 | 14 | 15.5 |
| BD (b) | 48.8 | 52.7 | 41 | 38.6 | 41.5 | 43.1 | 45.5 | 47.2 |
| BA (c) | 34.8 | | | | 14.3 | 21.2 | 11.1 | 17 |
| MEA (c) | | 27.6 | | | | | | |
| PEG-2-MA (d) | | | | 46.6 | | | | |
| PEG-3-MA (d) | | | 45.7 | | 34.2 | 22.8 | 29.4 | 20.3 |
| HNBR copolymer | parts | parts | parts | parts | parts | parts | parts | parts |
| HNBR 1 | 100 | | | | | | | |
| HNBR 2 | | 100 | | | | | | |
| HNBR 3* | | | 100 | | | | | |
| HNBR 4* | | | | 100 | | | | |
| HNBR 5* | | | | | 100 | | | |
| HNBR 6* | | | | | | 100 | | |
| HNBR 7* | | | | | | | 100 | |
| HNBR 8* | | | | | | | | 100 |
| Other components | phr | phr | phr | phr | phr | phr | phr | phr |
| N330 | 30 | 30 | 30 | 30 | 30 | 30 | 30 | 30 |
| Rhenofit DDA 70 | 1.4 | 1.4 | 1.4 | 1.4 | 1.4 | 1.4 | 1.4 | 1.4 |
| Vulkanox ® ZMB2 | 0.4 | 0.4 | 0.4 | 0.4 | 0.4 | 0.4 | 0.4 | 0.4 |
| Maglite ® DE | 2 | 2 | 2 | 2 | 2 | 2 | 2 | 2 |
| TAIC | 1.5 | 1.5 | 1.5 | 1.5 | 1.5 | 1.5 | 1.5 | 1.5 |
| PERKADOX ® 14-40 | 7 | 7 | 7 | 7 | 7 | 7 | 7 | 7 |
| Vulcanizate properties | | | | | | | | |
| Glass transition temp. (Tg) | −40 | −37 | −47 | −47 | −49 | −47 | −45 | −44 |
| Swelling in IRM 903 | 51 | 27 | 39 | 42 | 50 | 51 | 31 | 43 |

The terpolymer of the comparative experiment V1 contains more than 25% by weight of α,β-ethylenically unsaturated carboxylic ester units but no PEG acrylate units. Amounts of more than 25% by weight of butyl acrylate are not by themselves sufficient to achieve a glass transition temperature of less than −40° C. in the vulcanizate.

The terpolymer of comparative experiment V2 contains more than 25% by weight of α,β-ethylenically unsaturated carboxylic ester units, namely methoxyethyl acrylate (PEG-1 acrylate) but no PEG acrylate units comprising ethylene glycol repeating units of n>1. Amounts of more than 25% by weight of PEG-1 acrylate are not by themselves sufficient to achieve a glass transition temperature of less than −40° C. in the vulcanizate.

The inventive vulcanizates 3 to 8 contain HNBR copolymer comprising at least 15% by weight of PEG acrylate units (d) and at least two ethylene glycol repeating units.

The inventive terpolymers of experiments V3 and V4 each contain more than 25% by weight of PEG-2-MA and PEG-3-MA. The vulcanizates feature a low glass transition temperature and a low swelling in IRM 903.

The inventive quaterpolymers of the experiments V5 to V8 contain both PEG-3-MA and butyl acrylate wherein the amount of PEG-3-MA is in each case greater than 15% by weight and the total amount of carboxylic ester units is more than 25% by weight. The vulcanizates feature a low glass transition temperature and a low swelling in IRM 903.

As the amount of acrylonitrile units (a) increases the glass transition temperature deteriorates. At an acrylonitrile content of more than 20% by weight the glass transition temperature of the vulcanizate is no longer acceptable.

As the amount of PEG acrylate units (d) decreases the swelling deteriorates. At a PEG acrylate content of less than 15% by weight the swelling of the vulcanizate in IRM 903 is no longer acceptable.

Furthermore, the inventive vulcanizates which comprise ter- and quaterpolymers comprising PEG-2-MA repeating units also have the feature that they have a particularly low gel content.

The advantage of the invention is in particular that vulcanizates based on the inventive hydrogenated nitrile-diene-carboxylic ester copolymers have a glass transition temperature of less than −40° C. and
a swelling in IRM 903 of 51% or less.

In terms of the combination of these properties the inventive hydrogenated nitrile-diene-carboxylic ester copolymers are superior to hitherto commercially available hydrogenated nitrile-diene-carboxylic ester copolymers.

The invention claimed is:

1. Hydrogenated nitrile-diene-carboxylic ester copolymers comprising:
   (a) 0.1% to 20% by weight of at least one α,β-ethylenically unsaturated nitrile unit,
   (b) 15% to 74.9% by weight of at least one conjugated diene unit, wherein the conjugated diene units (b) are hydrogenated to an extent of 50% to 100%,
   (c) 26% to 65% by weight of at least one α,β-ethylenically unsaturated carboxylic ester unit,
   wherein at least 15% by weight, of the α,β-ethylenically unsaturated carboxylic ester units (c) based on the total amount of all monomer units of 100% by weight are derived from a PEG acrylate (d) of general formula (I)

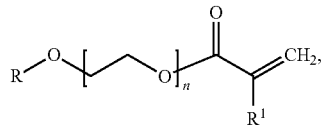

formula (I)

wherein
R is branched or unbranched $C_1$-$C_{20}$-alkyl,
n is 2 to 12, and
$R^1$ is hydrogen or $CH_3$—.

2. Hydrogenated nitrile-diene-carboxylic ester copolymers according to claim 1, comprising:
   (a) 1% to 19% by weight of at least one α,β-ethylenically unsaturated nitrile unit,
   (b) 21% to 73% by weight of at least one conjugated diene unit and
   (c) 26% to 60% by weight of at least one α,β-ethylenically unsaturated carboxylic ester unit,
   wherein at least 15% by weight, of the α,β-ethylenically unsaturated carboxylic ester units (c) based on the total amount of all monomer units of 100% by weight are derived from a PEG acrylate (d) of general formula (I)

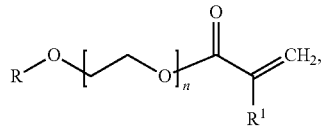

formula (I)

wherein
R is branched or unbranched $C_1$-$C_{20}$-alkyl, n is 2 to 12, and $R^1$ is hydrogen or $CH_3$—.

3. Hydrogenated nitrile-diene-carboxylic ester copolymers according to claim 1, comprising:
   (a) 8% to 18% by weight of at least one α,β-ethylenically unsaturated nitrile unit,
   (b) 27% to 65% by weight of at least one conjugated diene unit and
   (c) 27% to 55% by weight of at least one α,β-ethylenically unsaturated carboxylic ester unit,
   wherein at least 15% by weight, of the α,β-ethylenically unsaturated carboxylic ester units (c) based on the total amount of all monomer units of 100% by weight are derived from a PEG acrylate (d) of general formula (I)

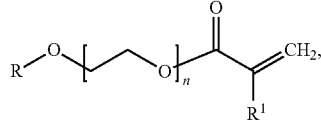

formula (I)

wherein
R is branched or unbranched $C_1$-$C_{20}$-alkyl, n is 2 to 12, preferably 2 to 8, and
$R^1$ is hydrogen or $CH_3$—.

4. Hydrogenated nitrile-diene-carboxylic ester copolymers according to claim 1, wherein:

the α,β-ethylenically unsaturated nitrile units (a) are selected from: acrylonitrile, methacrylonitrile, ethacrylonitrile and mixtures thereof.

5. Hydrogenated nitrile-diene-carboxylic ester copolymers according to claim 1, whereine the conjugated diene units (b) are selected from: 1,3-butadiene, isoprene, 2,3-dimethylbutadiene, 1,3-pentadiene (piperylene) and mixtures thereof.

6. Hydrogenated nitrile-diene-carboxylic ester copolymers according to claim 1, wherein the PEG acrylate units (c) are selected from: ethoxy, butoxy and ethylhexyloxy polyethylene glycol (meth)acrylate comprising 2 to 12 ethylene glycol repeating units.

7. Hydrogenated nitrile-diene-carboxylic ester copolymers according to claim 1, wherein the PEG acrylate units (c) are selected from: ethoxy and butoxy polyethylene glycol (meth)acrylate comprising 2 to 5 ethylene glycol repeating units.

8. Hydrogenated nitrile-diene-carboxylic ester copolymers according to claim 1, wherein the PEG acrylate units (c) are selected from: ethoxy and butoxy polyethylene glycol (meth)acrylate comprising 2 or 3 ethylene glycol repeating units.

9. Hydrogenated nitrile-diene-carboxylic ester copolymers according to claim 1, wherein n is 2 or 3, R is ethyl or butyl and $R^1$ is hydrogen or methyl.

10. Hydrogenated nitrile-diene-carboxylic ester copolymers according to claim 1, wherein n is 2, R is butyl and $R^1$ is methyl.

11. Hydrogenated nitrile-diene-carboxylic ester copolymers according to claim 1, wherein the copolymers comprise 8% to 18% by weight of acrylonitrile units, 27% to 65% by weight of 1,3-butadiene units and 27% to 55% by weight of PEG-2 acrylate units or PEG-3 acrylate units.

12. A process of producing hydrogenated nitrile-diene-carboxylic ester copolymers according to claim 1, wherein at least one α,β-ethylenically unsaturated nitrile, at least one conjugated diene and at least one α,β-ethylenically unsaturated carboxylic ester are subjected to an emulsion polymerization and subsequently hydrogenated.

13. A process according to claim 12, wherein at least one α,β-ethylenically unsaturated nitrile, at least one conjugated diene and at least one PEG acrylate of general formula (I) are subjected to an emulsion polymerization and subsequently hydrogenated.

14. A vulcanizable mixture containing hydrogenated nitrile-diene-carboxylic ester copolymers according to claim 1, and at least one crosslinker.

15. A process of producing vulcanizable mixtures comprising the step of: mixing a hydrogenated nitrile-diene-carboxylic ester copolymer according to claim 1 with at least one crosslinker.

16. A process of producing vulcanizates, comprising the step of: subjecting the vulcanizable mixture according to claim 14 to a vulcanization, at temperatures in the range from 100° C. to 250° C.

17. A process according to claim 16, wherein the temperatures are in the range from 120° C. to 250° C.

18. A process according to claim 17, wherein the temperatures are in the range from 130° C. to 250° C.

19. Vulcanizates formed by a process according to claim 16.

20. Vulcanizates according to claim 19, which are moulding selected from: belts, seals, rollers, shoe components, hoses, damping elements, stators and cable sheaths.

21. Mouldings selected from the group consisting of belts, seals, rollers, shoe components, hoses, damping elements, stators and cable sheaths, which mouldings comprise a hydrogenated nitrile-diene-carboxylic ester copolymer according to claim 1.

* * * * *